US009361586B2

(12) United States Patent
Jaros et al.

(10) Patent No.: US 9,361,586 B2
(45) Date of Patent: Jun. 7, 2016

(54) METHOD AND SYSTEM FOR INVARIANT PATTERN RECOGNITION

(75) Inventors: Robert Gilchrist Jaros, Palo Alto, CA (US); Simon Kayode Osindero, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 807 days.

(21) Appl. No.: 12/962,632

(22) Filed: Dec. 7, 2010

(65) Prior Publication Data

US 2015/0227849 A1  Aug. 13, 2015

Related U.S. Application Data

(60) Provisional application No. 61/267,437, filed on Dec. 7, 2009.

(51) Int. Cl.

| G06K 9/62 | (2006.01) |
| G06N 7/00 | (2006.01) |
| G06N 99/00 | (2010.01) |
| G06N 3/04 | (2006.01) |
| G06N 3/02 | (2006.01) |
| G06N 3/08 | (2006.01) |

(52) U.S. Cl.
CPC .............. *G06N 7/005* (2013.01); *G06N 3/0454* (2013.01); *G06N 99/005* (2013.01); *G06N 3/02* (2013.01); *G06N 3/08* (2013.01)

(58) Field of Classification Search
CPC .............. G06N 3/02; G06N 3/08; G06K 9/00
See application file for complete search history.

(56) References Cited

FOREIGN PATENT DOCUMENTS

GB      WO0167382      *  9/2001  .............. G06K 9/66

OTHER PUBLICATIONS

Salakhutdinov et al., "Deep Boltzmann Machines", Apr. 18, 2009, Proceedings of the 12th International Conference on Artificial Intelligence and Statistics 2009, vol. 5, p. 448-455.*
Salakhutdinov et al., "Restricted Boltzmann Machines for Collaborative Filtering", Jun. 24, 2007, Proceedings of the 24th International Conference on Machine Learning 2007, p. 791-798.*
Giles et al., "Learning, invariance, and generalization in high-order neural networks", Dec. 1, 1987, Applied Optics, vol. 26, No. 23, p. 4972-4978.*
Sejnowski, "Higher-order Boltzmann Machines", 1986, American Institute of Physics Conf. Proc. 151, p. 398-403.*

* cited by examiner

*Primary Examiner* — Stephen R Koziol
*Assistant Examiner* — Timothy Choi
(74) *Attorney, Agent, or Firm* — Berkeley Law & Technology Group, LLP (57) ABSTRACT

An adaptive pattern recognition system optimizes an invariance objective and an input fidelity objective to accurately recognize input patterns in the presence of arbitrary input transformations. A fixed state or value of a feature output can nonlinearly reconstruct or generate multiple spatially distant input patterns and respond similarly to multiple spatially distant input patterns, while preserving the ability to efficiently evaluate the input fidelity objective. Exemplary networks, including a novel factorization of a third-order Boltzmann machine, exhibit multilayered, unsupervised learning of arbitrary transformations, and learn rich, complex features even in the absence of labeled data. These features are then used to classify unknown input patterns, to perform dimensionality reduction or compression.

20 Claims, 5 Drawing Sheets

METHOD AND SYSTEM FOR INVARIANT PATTERN RECOGNITION

CROSS-REFERENCE TO RELATED APPLICATIONS

The present application claims benefit of Provisional Application Ser. No. 61/267,437, filed Dec. 7, 2009.

FIELD OF THE INVENTION

The present invention relates generally to pattern recognition and, more particularly, to machine learning models that recognize patterns across heterogeneous transformations.

BACKGROUND OF THE INVENTION

Pattern recognition systems typically receive digital inputs containing patterns (e.g., digital images containing real-world objects), extract "features" from the digital inputs (i.e., numeric or symbolic information from the digital input) using a "feature extraction" component, and ultimately classify or identify various patterns found in the digital input based upon the extracted features using a "classifier" component. Frequently the features are hand-crafted or pre-specified, but this limits the richness of features and the portability of the features from one domain to another (e.g., features crafted for handwritten digits are unlikely to be useful for 3-d object recognition, let alone for speech recognition). Much more sophisticated and flexible features can be learned from observations of digital input examples (a collection of such digital input examples sometimes referred to as a "training set"); in this context, the term "feature" can be arbitrarily high-level, and may even map directly to the class of the object (e.g., in handwritten digit recognition, each feature value may correspond to one of the digits).

Effective pattern recognition systems need to be able to identify a particular pattern despite the various transformations that the pattern may potentially undergo. For example, in the context of computer vision, the same real-world object can be depicted quite differently across a number of digital images. The same real-world object could be scaled, rotated in-plane, rotated out-of-plane and illuminated from different angles with different lights across various digital images. Non-rigid real-world objects could be further stretched, bent, or skewed. Each of these transformations could potentially lead to a change of pixel values in a digital image that is greater than if the object itself were replaced by an entirely different object. An effective real-world pattern recognition computer system needs to be "invariant" to (i.e., able to recognize the object despite) the vast number of transformations an object can undergo.

Many pattern recognition systems focus on one type of transformation: translation (where the "translation" of an image feature or an object in a digital image refers to the shifting of that image feature or object from one location in the digital image to a different location). Typically, the mechanism for translation invariance is embedded into the architecture itself of the pattern recognition system, and such architecture is specific to translations: e.g. by pooling responses of identical spatial feature detectors across different windows (where "pooling" is a disjunctive function of inputs or an approximation thereof). When compared to translations, other types of transformations can have far more complex influences on the digital inputs and therefore it is impracticable to encode all relevant such transformations into the architecture. It is thus preferable for invariant pattern recognition to utilize an architecture and learning objectives that are flexible enough to be invariant to a wide range of transformations.

While features learned by a pattern recognition system should be invariant to transformations of an object, they should also be simultaneously specific and distinct enough to distinguish between patterns corresponding to different objects, while broad enough to represent the full richness of digital input possibilities. While various rules and heuristics may encourage such properties in features, it remains challenging to consistently learn a pattern recognition system that achieves such properties and to make proper inferences on the system without a unifying set of mathematical objectives. For example, the pattern recognition system may assign too many features to an area of the input space, leaving much of the rest of the space under-represented. Alternatively, it may improperly infer that competing features for describing an input characteristic are both true with much higher probability than the input statistics would imply, because the inference rules inherently assume that the features are conditionally independent, while the learning rules makes intrinsically causal assumptions. With regard to mathematical objectives that alleviate such concerns, one or multiple "input fidelity" objectives may be defined, wherein "input fidelity" refers to the preservation of relevant information about the digital input. For example, the pattern recognition system may contain a component for stochastically producing digital inputs, and optimize the probability of such component creating the digital inputs in the training set (such an objective referred to as a "likelihood objective" or simply "maximum likelihood"). Alternatively, the pattern recognition system may contain a component for reconstructing a digital input from the features, and seek reconstructions that are as similar as possible to the original digital input (such an objective referred to as a "reconstruction error objective").

One challenge with combining invariance objectives with input fidelity objectives in existing systems is that the two objectives may have conflicting effects. Given a typical mechanism for generating or reconstructing digital inputs, a feature output with a particular state or value may only generate or reconstruct a limited set of digital inputs. If, for a transformation of interest, two different transformed states of a digital input differ by a range outside the limited generative/reconstructive range of a feature output, then such feature output may not be able to accurately generate/reconstruct the transformed states of a digital input. Given this, the input fidelity objective may work to prevent such feature from responding similarly to different transformed states of a digital input, in direct opposition to the invariance objective.

BRIEF SUMMARY OF THE INVENTION

According to at least one aspect of one or more embodiments of the present invention, a method to facilitate invariant pattern recognition comprises receiving a set of input vectors to a machine learning component; and calculating a set of feature vectors based upon the parameters of the machine learning component; and optimizing an input fidelity objective based upon the received input vectors and the machine learning component's parameters, wherein the input fidelity objective encourages that non-linear reconstructions or generations produced by the component are similar to the set of input vectors; and optimizing an invariance objective based upon the received input vectors and the machine learning component's parameters, wherein the invariance objective encourages that the feature vectors produced by transformations of an input have similar output vectors to feature vectors of the non-transformed input vector; and adjusting the machine learning component's parameters based upon the optimizations.

According to at least one other aspect of one or more embodiments of the present invention, a computer-implemented system for pattern recognition comprises a machine learning component comprising one or a plurality of layers, each layer capable of computing feature vectors based upon input vectors and computing nonlinear reconstructions or generations of input vectors based upon feature vectors; an optimizer for maximizing an input fidelity objective based upon the received input vectors and the machine learning component's parameters, wherein the input fidelity objective encourages that non-linear reconstructions or generations produced by the component are similar to the set of input vectors; and an optimizer for maximizing an invariance objective based upon the received input vectors and the machine learning component's parameters, wherein the invariance objective encourages that the output vectors of transformations of an input have similar output vectors to the output vectors of the non-transformed input vector.

DETAILED DESCRIPTION OF THE PREFERRED EMBODIMENTS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
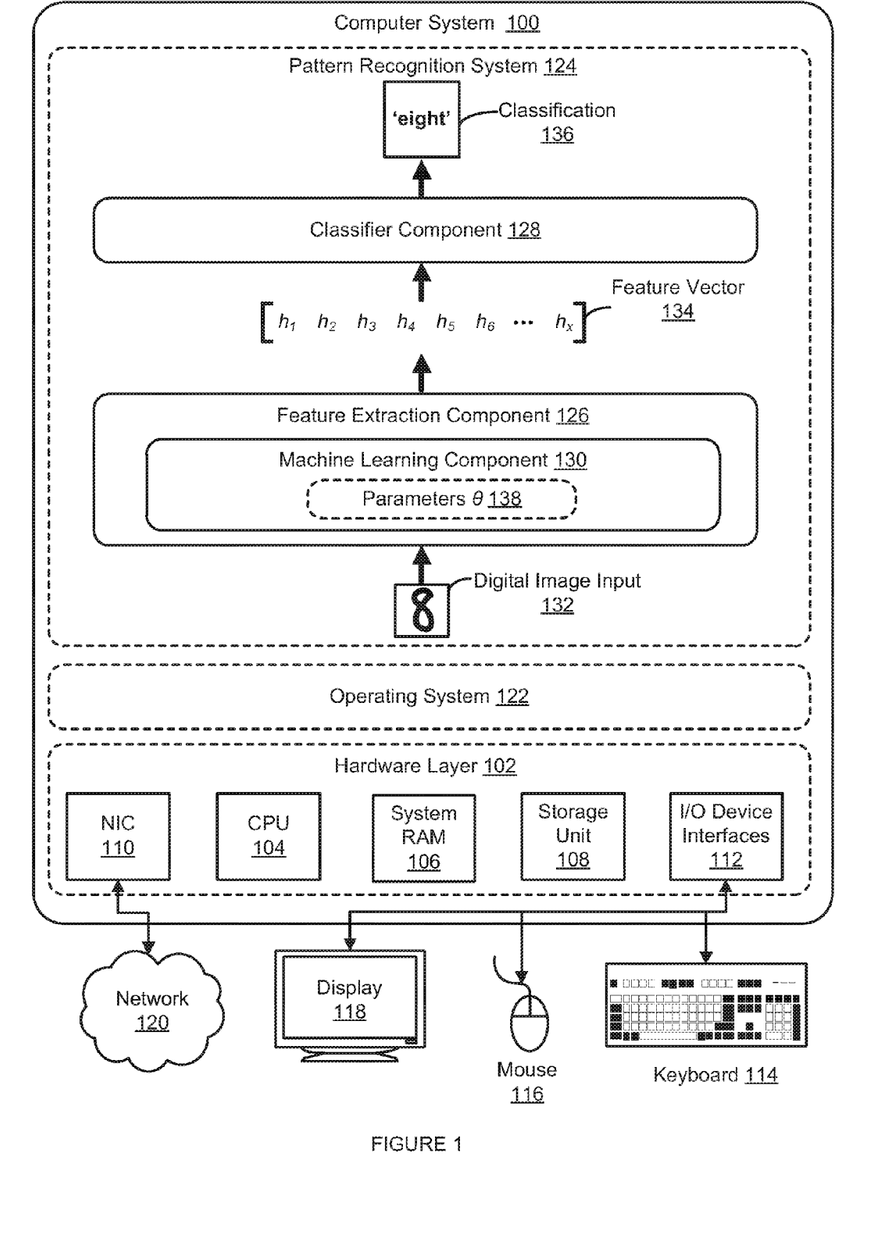
FIG. 1 depicts a pattern recognition computer system with a machine learning feature extraction component, according to an embodiment of the invention.

FIG. 1 depicts a pattern recognition computer system with a machine learning feature extraction component, according to an embodiment of the invention. Computer system 100 comprises a hardware layer 102 that includes a processor (CPU 104), a system random access memory (RAM) 106, and a storage unit 108, such as a hard drive. Hardware layer 102 further includes a network interface card (NIC) 110 that enables computer system 100 to connect to a network 120 such as the Internet as well as various I/O device interfaces 112 that enable computer system 100 to receive input from a keyboard 114 and mouse 116 and present output on a display 118. Hardware layer 102 supports the execution of an operating system 122 in system RAM 106, such as, for example, Microsoft Windows, Linux, Solaris x86, NetWare, FreeBSD, Mac OS or any other computer system operating system. Pattern recognition system 124 is an application that runs on top of operating system 124. It should be recognized that computer system 100 is merely exemplary of any number of computer system designs and architectures that may be used to implement a pattern recognition system consistent with the discussions herein. For example, alternative computer system embodiments may utilize a multi-processor CPU, graphics processing units (GPUs), or serve as a networked server that receives inputs through the Internet (as opposed to through a keyboard and mouse) Similarly, other alternative computer system embodiments may be comprised of multiple computer systems networked together, providing shared resources to pattern recognition system 124.

Pattern recognition system 124 receives a digital image input, such as digital image input 132 of a handwritten numeral "8" and forwards digital image input 132 to feature extraction component 126. As further described herein, given digital image input 132, feature extraction component 126 outputs a feature vector 134, which is a vector of values representing relevant information extracted from digital image input 132 that enables a classifier component 128 of the pattern recognition system 124 to classify digital image input 132 as a member of the "eight" classification 136. Feature extraction component 126 includes a machine learning component 130, such as a neural network. Machine learning component 130 includes a set of parameters θ 138 that are utilized in computations to produce feature vector 134. For example and as further discussed below, for a machine learning component that is a neural network, such parameters may include the weight values among the units of the neural network. Provided a "training" set of digital input images during a learning phase and based on its machine learning algorithm, machine learning component 130 adaptively changes its internal structure (i.e., parameters θ 138) to produce desired outputs according to certain set learning objectives (e.g., transformation invariance, maximum likelihood, etc.)

Learning Objectives for Machine Learning Component

Figure 2:
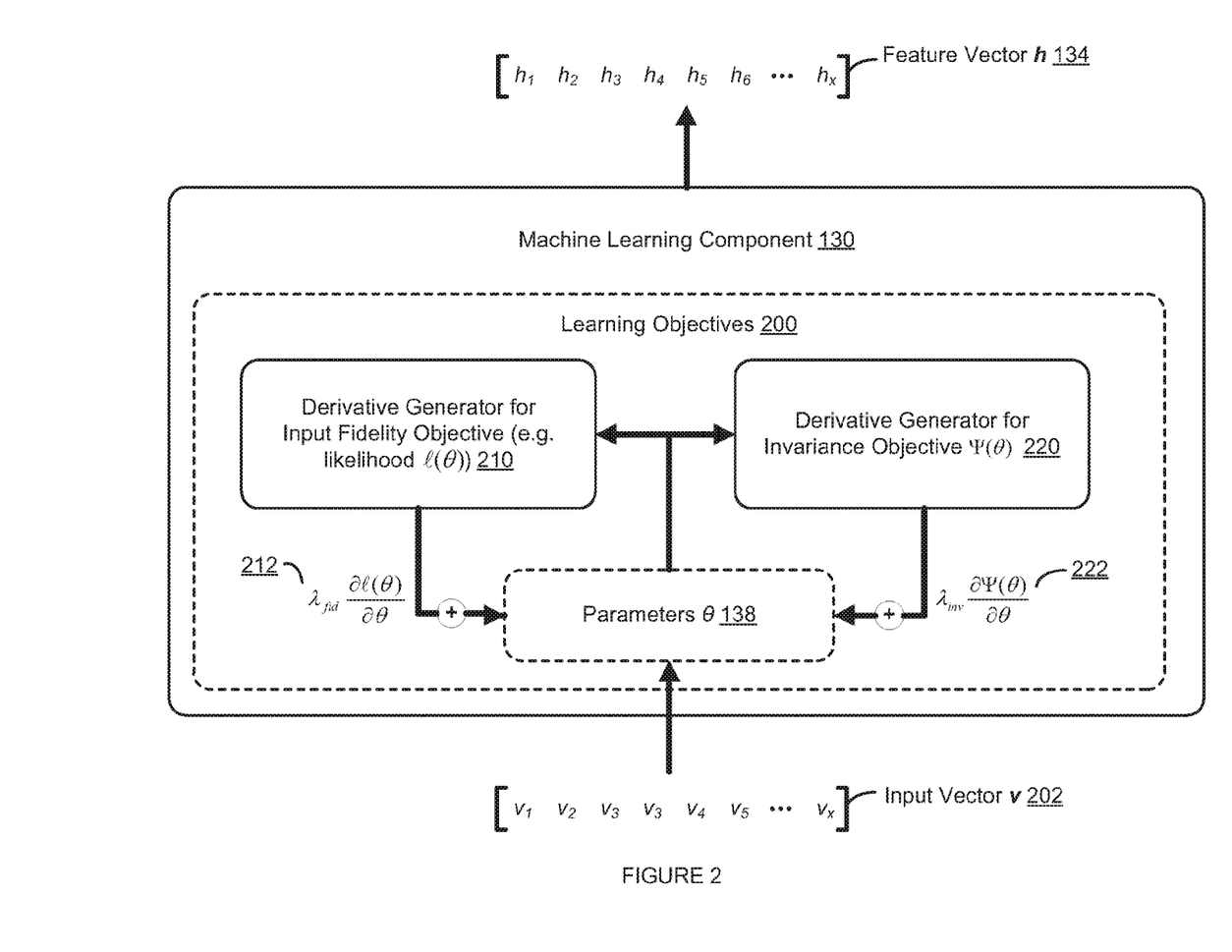
FIG. 2 depicts a flowchart of the steps for training a machine learning component in accordance with set learning objectives, according to an embodiment of the invention.

FIG. 2 depicts a diagram for training a machine learning component in accordance with set learning objectives, according to an embodiment of the invention. Machine learning component 130 executes by optimizing one or more learning objectives 200 that are mathematically or heuristically described as a function of its parameters θ 138 and inputs into machine learning component 130, such as input vector v 202.

In one embodiment, machine learning component 130 learns in accordance with at least two learning objectives: (1) an input fidelity objective (e.g. likelihood, reconstructive error, etc.), and (2) an invariance learning objective (e.g., transformation invariance, intra-class invariance, etc.) In one embodiment that utilizes an exemplary optimization technique known as gradient ascent, when machine learning component 130 receives input vector v 202 (e.g. as part of its training set of inputs during a learning phase), it adjusts parameters θ 138 by adding to parameters θ 138 a scaled derivative of each learning objective 200 with respect to parameters θ 138. A derivative generator 210 generates the derivative of an input fidelity objective with respect to the parameters; scales by a scaling factor $\lambda_{fid}$; and adds the scaled derivative 212 to the parameters. Simultaneously or sequentially, a derivative generator 220 generates the derivative of an invariance objective with respect to the parameters; scales by a scaling factor $\lambda_{inv}$; and adds the scaled derivative 222 to the parameters.

With respect to input fidelity objectives, machine learning component 130 includes an input-production component and the input fidelity objective ensures that machine learning component 130 has captured meaningful statistical structure about the input vectors by requiring that common input vectors to machine learning component 130 can be produced (or approximately produced) by the input-production component. An example of an input-production component for an optical character recognition system would be a parameterized system capable of producing images of characters. One embodiment of an input fidelity objective is a reconstruction error objective, in which the input-production component translates features vectors into input vectors, and the objective seeks parameters which minimize (or approximately minimize) the difference between the vectors produced by suck input-production component and the true input vectors. Another embodiment of an input fidelity objective is likelihood objective, in which the input-production component produces input vectors stochastically with some probability, and the likelihood objective seeks parameters that maximize (or approximately maximize) the overall probability of all input vectors. Sometimes the probability cannot be exactly compute, but approximations may be used. A further embodiment of an input fidelity objective is one in which noise or corruption are introduced to input vectors, and the system is trained to form an internal representation that when passed through the input production component reproduces the original data vectors before they had been corrupted.

With respect to invariance learning objectives, one embodiment of an invariance learning objective for machine learning component 130 seeks to learn invariance for transformations. Generally, a transformation is a one-to-many mapping, from an original particular input or input feature to a set of (transformed) inputs or input features. Machine learning component 130 is invariant to a transformation to the extent that the feature vector it produces for an input is similar to the feature vectors it produces for the transformations of that input.

An alternative embodiment further (or separately) seeks to learn invariance for intra-class variation. If a set of inputs are known or otherwise assumed to belong to a single class (e.g. two different images of '8' in a digit recognition system), then machine learning component 130 is invariant to intra-class variation to the extent that the feature vector produced by one member of the class is similar to the feature vectors produced by one or more other members of the class.

With respect to intra-class variation, a set of inputs within the same class can generally be viewed as a transformation of one member of the class, even if such a transformation does not correspond to a true physical transformation of the member. For example, in an optical character recognition system, the class of different images of '8' can be viewed as transformations of each other. Similarly, in a visual recognition system trained to recognize categories of objects, one pair of transformed examples can be two photos of two different dogs. The transformation from one dog to a different dog does not occur in the physical world. As such, use of the terms "transformation," "transformation invariance," "transformed", and the like may generally be deemed to include intra-class variation as the context requires.

To learn such foregoing invariance objectives, in one embodiment, machine learning component 130 is presented with a plurality of input vectors, each input vector a different example of a transformed input or input feature, and seeks to minimize the expected change between the activities of particular features. For example, given M examples of input transformation pairs, where $(v_A^m, v_B^m)$ denotes an $m^{th}$ pair of examples of transformed input vectors, machine learning component 130 produces feature vectors $(h_A^m, h_B^m)$. Then for each feature element $h_j$ of the feature vector h, machine learning component 130 minimizes or approximately minimizes the following invariance learning objective over the examples (e.g., using gradient ascent, etc.):

$$\Psi_j(\theta) = \left( \frac{1}{M} \sum_{m=1}^{M} (h_{j,A}^m - h_{j,B}^m)^2 \right)^{-1} \quad (1)$$

In an alternative embodiment, the invariance objective in Equation (1) further includes a term that encourages variation in activity across all examples (while the original objective continues to discourage variation between examples of transformed inputs). One mechanism to do this is with an additional term that encourages non-transformed inputs to have dissimilar responses. For example, if the $m^{th}$ example includes one pair of transformed inputs $(h_A^m, h_B^m)$ and one pair of dissimilar inputs $(h_C^m, h_D^m)$, then one objective might be:

$$\Psi_j(\theta) = \left( \frac{1}{M} \sum_{m=1}^{M} (h_{j,A}^m - h_{j,B}^m)^2 - \lambda (h_{j,C}^m - h_{j,D}^m)^2 \right)^{-1} \quad (2)$$

where $\lambda$ is some constant chosen to weigh the relative goals of encouraging similar responses between transformed inputs and encouraging overall variation.

Yet a further alternative objective that encourages overall variation multiplies Equation (1) by the variance of the feature activity across all examples:

$$\Psi_j(\theta) = \frac{\frac{1}{2M} \sum_{l=\{A,B\}} \sum_{m=1}^{M} (h_{j,l}^m - \mu_{h_j})^2}{\frac{1}{M} \sum_{m=1}^{M} (h_{j,A}^m - h_{j,B}^m)^2} \quad (3)$$

where $$\mu_{h_j} = \frac{1}{2M} \sum_{\{A,B\}}^{l} \sum_{m=1}^{M} h_{j,l}^m.$$

One way to get examples of transformations is to obtain an set of inputs observed over time. Many transformations of interest are precisely those which unfold over time in the real world: for example, in the context of vision systems, real-world videos contain in-plane rotations, out-of-plane rotations, translations, scalings, non-rigid transformations, and other transformations as the camera interacts with the world and the objects themselves cause and undergo transformations.

In the context of temporal coherence, an analogous objective to Equation (3) can be constructed. Assume there are M temporal sequences, each of length T, and that $\{v_1^m, v_2^m, \ldots v_T^m\}$ is the $m^{th}$ sequence of input vectors, producing feature vectors $\{h_1^m, h_2^m, \ldots h_T^m\}$.

$$\Psi_j(\theta) = \frac{\frac{1}{MT} \sum_{m=1}^{M} \sum_{t=1}^{T} (h_{j,t}^m - \mu_{h_j})^2}{\frac{1}{M(T-1)} \sum_{m=1}^{M} \sum_{t=2}^{T} (h_{j,t}^m - h_{j,t-1}^m)^2} \quad (4)$$

where

-continued $$\mu_{h_j} = \frac{1}{MT} \sum_{m=1}^{M} \sum_{m=1}^{T} h_{j,t}^m. \quad (5)$$

In an alternative embodiment of machine learning component 130, rather than seeking to maximize (or otherwise optimize) the invariance learning objective, a desired level $\Psi_j^*$ for the invariance learning objective is chosen. For example, such an alternative embodiment may minimize $(\Psi_j(\theta)-\Psi_j^*)^2$ with respect to the parameters $\theta$ of the system, enabling machine learning component 130 to be configurable with respect to how invariant it desires to be to particular transformations, and also to encourage different features to be more or less invariant than others:

$$\Psi_j(\theta) = \left( \frac{\frac{1}{MT}\sum_{m=1}^{M}\sum_{t=1}^{T}(h_{j,t}^m - \mu_{h_j})^2}{\frac{1}{M(T-1)}\sum_{m=1}^{M}\sum_{t=2}^{T}(h_{j,t}^m - h_{j,t-1}^m)^2} - \Psi_j^* \right)^2 \quad (6)$$

Figure 3:
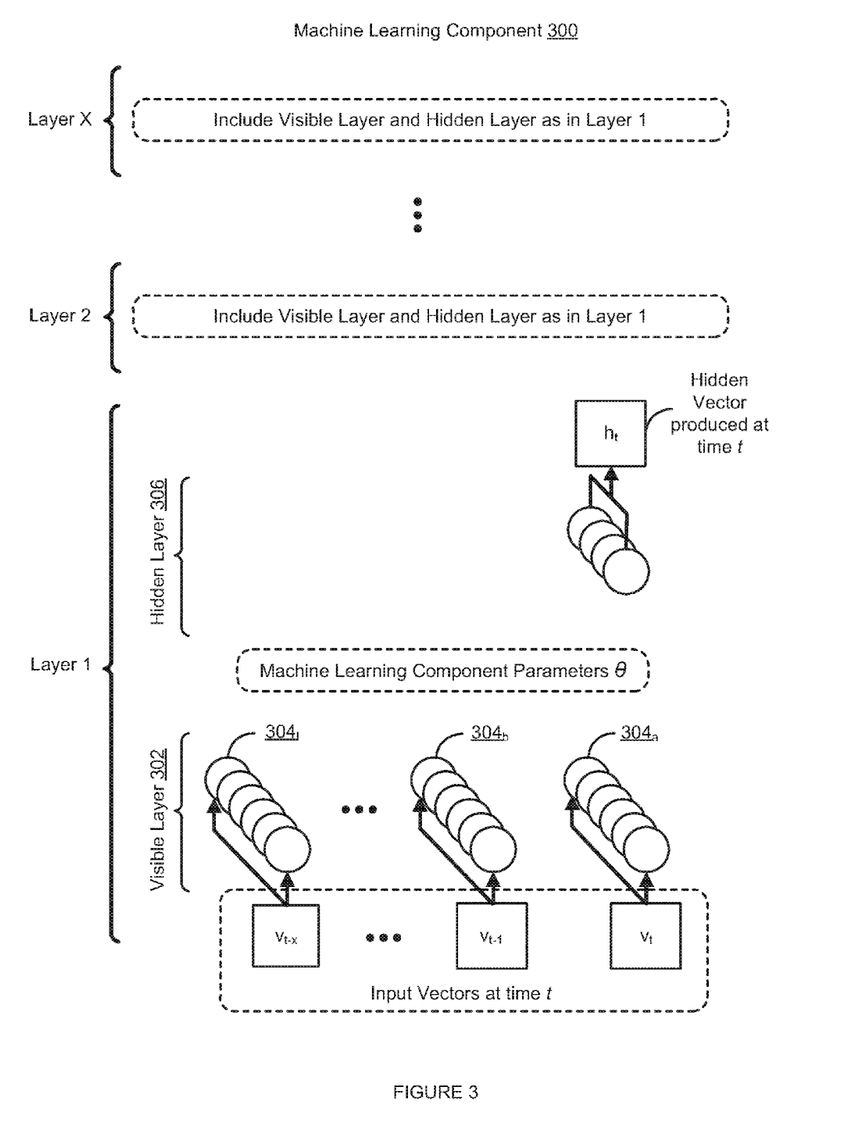
FIG. 3 depicts a machine learning component, according to an embodiment of the invention.

In embodiments where machine learning component 130 is multilayered, such as in the machine learning component of FIG. 3, the invariance objective can be applied to each layer. If the invariance objective drives towards a particular target $\Psi^*$, the target may be chosen to become increasingly invariant at higher levels of the hierarchy.

It should be recognized that there are many other ways to mathematically describe such invariance objectives other than Equations (1-6), such as, for example, considering different norms, different notions of stability, and different notions of overall variation. It should further be recognized by those of ordinary skill in the art how to generalize the assumptions provided herein, for example, for when temporal sequences are not all of the same length, or when the temporal coherence is evaluated over longer time-spans (than t−1 to t).

The invariance objectives described herein could be applied to many different forms of machine learning component architectures, but certain machine learning component architectures can have certain properties that allow it to take better advantage of the invariance for many tasks, including pattern recognition. For many types of features, there are many relevant transformations of an input that make it difficult for the feature type to respond to both that input and a transformation of that input. For example, some features have the property that they respond maximally to a certain region of space, and their response falls off for regions of space that have a large Euclidean distance from that region. Such units would have difficulty being invariant to transformations that span large Euclidean distances (for example, rotations of an edge may produce edges with large Euclidean distances from the original edge). Now follows descriptions of machine learning component architectures which are less prone to this short-coming, and better able to learn invariant features.

Machine Learning Component Architecture

FIG. 3 depicts a machine learning component, according to an embodiment of the invention. Machine learning component 300 is a probabilistic model that takes the form of a Boltzmann machine. It includes a visible layer 302 of visible units segmented into a plurality of rows (rows 304a, 304b ... 304l), wherein the number of visible units in each row corresponds to the width of an input vector received by machine learning component 300. At any particular point of time during a learning phase, machine learning component 300 receives a sequence of input vectors into visible layer 302, with each consecutive input vector being fed into a subsequent row of visible units in visible layer 302. For example, as depicted in FIG. 3, at a time t, "current" input vector $v_t$ is transmitted to visible unit row 304a, the immediately prior input vector $v_{t-1}$ is transmitted to visible unit row 304b and so forth (such a temporal sequence of input vectors sometimes referred to herein as "time-steps" of input vectors). The collection of input vectors before the current input vector ($\{v_{t-1}, v_{t-2} \ldots, v_{t-L}\}$) are collectively referred to as $v_{-t}$. Machine learning component 300 further comprises at least one hidden layer of hidden units, such as hidden layer 306. The visible units and hidden units may be interconnected with each other in any of a variety of ways, with each such interconnection having associated weight value. For example, as depicted in FIG. 3, as a result of the various interconnections, the transmission of a number of input vectors at time $_t$ to visible unit rows of visible layer 302 may result in the production of a hidden vector $h_t$ (for example, a subset of the hidden units of hidden lay 306 become activated). Such production of such a hidden vector is generally also referred to herein as "inferring" or an "inference" (whereas a production of a input vector is referred to herein as "generating" or "generation"). Each of the visible and hidden units of machine learning component 300 are stochastic binary units (i.e., the units are either "on" or "off", but their states are stochastically determined).

Some embodiments learn multilayered machine learning components, wherein the output of one layer is forwarded to another layer, for example as depicted in FIG. 3. In one embodiment, the hidden vector produced by the first layer at time t, $h_t$ would be treated as the visible vector of the second layer for time t, while the previous hidden vectors produced by the first layer would become the previous visible vectors. Alternative embodiments allow the layer above to "skip" or combine several time-steps of the hidden vectors from the layer below; this could be useful, for example, to model longer-range temporal dependencies by slowing the temporal granularity considered at each level.

It should be recognized that machine learning component 300 of FIG. 3 is merely exemplary of many learning architectures that may be used consistent with the teachings herein. For example, an alternative embodiment of machine learning component may utilize forms of units other than stochastic binary units, such as continuous (e.g. Gaussian) visible units, multinomial hidden units, or any other types of known units.

Figure 4:
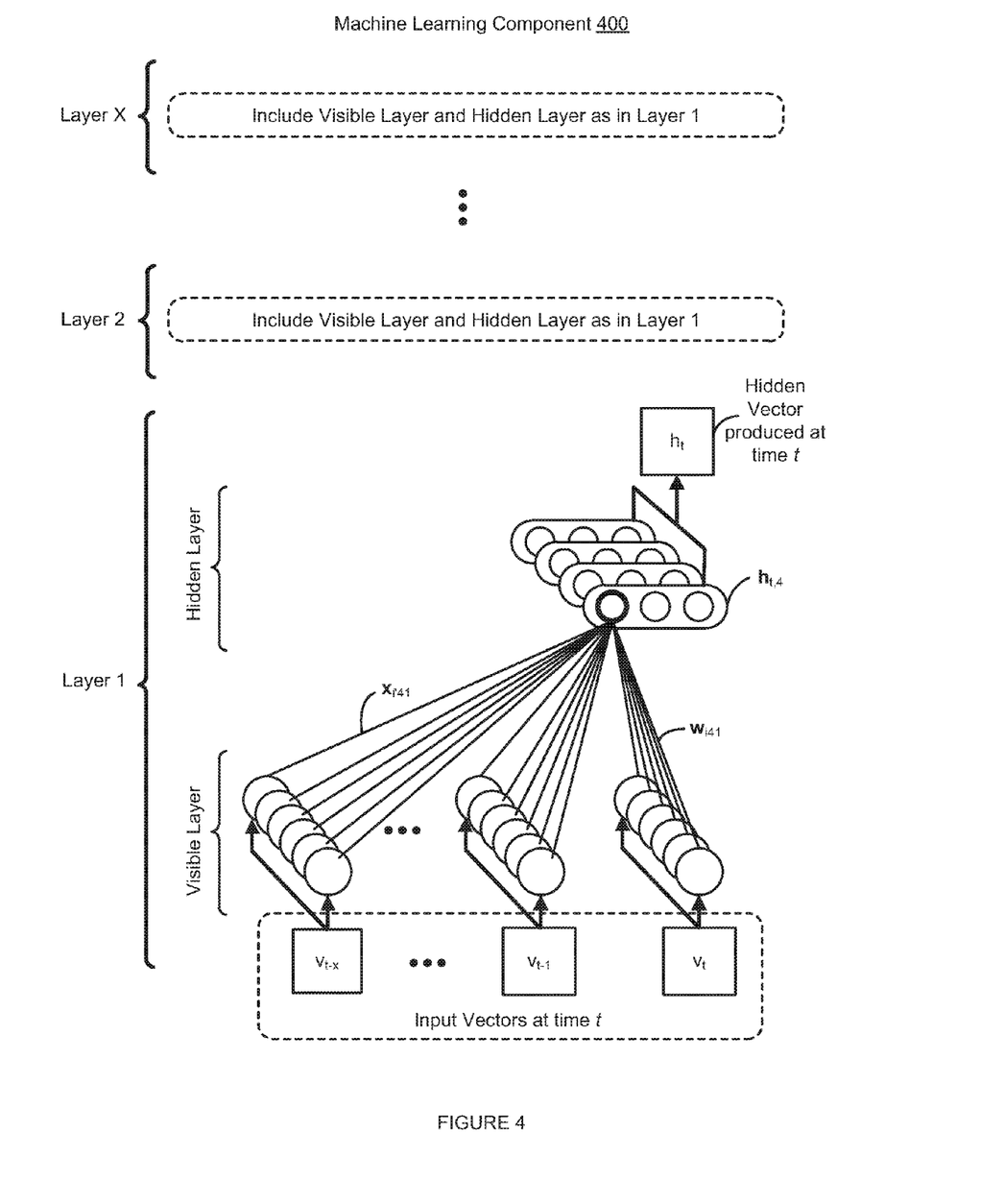
FIG. 4 depicts a machine learning component with an energy function utilizing factorization of a third-order Boltzmann machine, according to an embodiment of the invention.

Machine learning component 300 includes an "energy function" between these visible vectors and hidden vectors, $h_t$ and $h_{-t}$, where the −t subscript notation follows the same convention: $E(v_t, h_t|v_{-t}, h_{-t}; \theta)$. In an alternative embodiment, if only the current hidden vectors are considered, that energy function may be of the form $E(v_t, h_t|v_{-t}; \theta)$. One embodiment of an energy function used with machine learning component 300 (e.g., with stochastic binary units) is that of a third-order temporal restricted Boltzmann machine:

$$E(v_t, h_t | v_{-t}; \theta) = \sum_i \sum_j \sum_{i'} v_{t,i} h_{t,j} v_{-t,i'} w_{iji'} + \sum_j b_j^h h_j + \sum_i b_i^v v_i \quad (7)$$

where in this case, $\theta$ is the set of all weights $\{w_{iji'}\}$, $\{b_j^h\}$, $\{b_i^v\}$. In an alternative embodiment, an energy function utilizes a factorization of the third-order Boltzmann machine that is particularly well-suited to invariant pattern recognition (a machine learning component using such an energy function also referred to herein as an "invariant Boltzmann machine"):

$$E(v_t, h_t \mid v_{-t}; \theta) = \sum_i \sum_j \sum_{i'} v_{t,i} h_{t,j} v_{-t,i'} \sum_d w_{ijd} x_{i'jd} + \sum_j b_j^h h_j + \sum_i b_i^v v_i \quad (8)$$

where d is a constant (typically d is less than the number of visible or hidden units), and θ is now the set of all weights $\{w_{ijd}\}, \{x_{i'jd}\}, \{b_j^h\}$. FIG. 4 depicts a machine learning component with such an energy function.

Machine learning component 300 is further characterized as having a particular configuration of $v_t$ and $h_t$ with the following probability function that is based on its energy function:

$$P(v_t, h_t \mid v_{-t}; \theta) = \frac{\exp(-E(v_t, h_t \mid v_{-t}; \theta))}{\sum_{v_t} \sum_{h_t} \exp(-E(v_t, h_t \mid v_{-t}; \theta))} \quad (9)$$

Using this probability function, inference is performed by calculating $P(h_t \mid v_t, v_{-t}; \theta)$ and generation is performed by calculating $P(v_t \mid h_t, v_{-t}; \theta)$.

The energy functions in Equations (7) and (8) have the property that the previous visible units affect not only which hidden units generate, but also how they generate. That is, the previous visible units modulate the energies between current visible and hidden units, effectively acting as if a new pairwise visible-hidden energy function is created for each set of previous visible vectors. Both Equation (7) and Equation (8) can be written in terms of $\tilde{w}_{ij}(v_{-t})$, where:

$$E(v_t, h_t \mid v_{-t}; \theta) = \sum_i \sum_j v_{t,i} h_{t,j} \tilde{w}_{ij}(v_{-t}) + \sum_j b_j^h h_j + \sum_i b_i^v v_i \quad (10)$$

For Equation (7):

$$\tilde{w}_{ij}(v_{-t}) = \sum_{i'} w_{iji'} v_{-t,i'} \quad (11)$$

For Equation (8):

$$\tilde{w}_{ij}(v_{-t}) = \sum_d w_{ijd} \sum_{i'} x_{i'jd} v_{-t,i'} \quad (12)$$

That is, each hidden unit j has d different possible connections to unit i, and each of these is multiplicatively modulated by the combined temporal influence from $v_{-t}$ through $x_{i'jd}$. In other words, each hidden unit has d different ways of interacting with every input unit, and the previous inputs select a weighted blending of these interactions. An alternative interpretation is to view the weights themselves as multiplicative weights, which is part of the source of the machine learning component's invariances. The multiplicative influence from the past allows for richer interactions than possible with biases alone: for example, the influence from previous inputs can "gate" hidden influences (turning them off) or even invert them.

Inference for Invariant Boltzmann Machine

Using Equation (8) with Equation (9), the hidden units are conditionally independent given the visible units, and the probability of a particular hidden unit $h_j$ being "on" (or have state=1) at time t is:

$$P(h_{t,j} = 1 \mid v_t, v_{-t}; \theta) = \sigma(\Delta E_{up,j}(v_t, v_{-t}; \theta)) \quad (13)$$

$$\Delta E_{up,j}(v_t, v_{-t}; \theta) = \sum_d \left(\sum_i v_{t,i} w_{ijd}\right)\left(\sum_{i'} v_{-t,i'} x_{i'jd}\right) + b_j^h$$

where $\sigma(x) = (1+\exp(-x))^{-1}$, and $\Delta E_{up,j}(v_t, v_{-t}; \theta)$ is the difference in energies between when unit $h_{t,j}$ is 1 and when unit $h_{t,j}$ is 0, given $v_t$ and $v_{-t}$.

In one embodiment, machine learning component 300 follows the following procedure to make inferences. The inputs to the machine learning component 300 are the current visible vector $v_t$ and the previous visible vector(s) $v_{-t}$, machine learning component 300 calculates the right hand side of Equation (13) for each hidden unit j, chooses a pseudo random number uniformly between 0 and 1 for each hidden unit, and sets each hidden unit to 1 if the quantity evaluated from the right hand side of Equation (13) is greater than the random number generated for that hidden unit (or otherwise it sets it to zero).

Generation for Invariant Boltzmann Machine

Again using Equation (8) with Equation (9), the current visible units are conditionally independent given the previous visible vector(s) and the current hidden vector. The probability of a particular hidden unit $v_i$ being "on" (or have state=1) at time t is:

$$P(v_{t,j} = 1 \mid h_t, v_{-t}; \theta) = \sigma(\Delta E_{dn,i}(h_t, v_{-t}; \theta)) \quad (14)$$

$$\Delta E_{dn,i}(h_t, v_{-t}; \theta) = \sum_j h_{t,j} \sum_d w_{ijd} \sum_{i'} v_{-t,i'} x_{i'jd} + b_i^v$$

where again $\sigma(x) = (1+\exp(-x))^{-1}$, and $\Delta E_{dn,i}(h_t, v_{-t}; \theta)$ is the difference in energies between when unit $v_{t,i}$ is 1 and when unit $v_{t,i}$ is 0, given $h_t$ and $v_{-t}$.

In one embodiment, machine learning component 300 follows the following procedure to generate. If the inputs to machine learning component 300 are the current hidden vector $h_t$ and the previous visible vector(s) $v_{-t}$, machine learning component 300 calculates the right hand side of Equation (14) for each visible unit i, chooses a pseudo random number uniformly between 0 and 1 for each visible unit, and sets each visible unit to 1 if the quantity evaluated from the right hand side of Equation (13) is greater than the random number generated for that visible unit (or otherwise it sets it to zero).

Approximate Maximum-Likelihood Learning for Invariant Boltzmann Machines

In order to achieve maximum likelihood learning in machine learning component 300, given the probability in Equation (9), the derivative 212 of the log-likelihood of a vector $v_t^m$ with respect to a specific parameter $\theta_l$ is:

$$\frac{\delta l(\theta)}{\delta \theta_l} = \quad (15)$$

$$\frac{\delta}{\delta \theta_l} \log P(v_t^m \mid v_{-t}^m; \theta) = \sum_{h_t^m} P(h_t^m \mid v_t^m, v_{-t}^m; \theta) \frac{\delta}{\delta \theta_l} E(v_t^m, h_t^m \mid v_{-t}^m; \theta) -$$

$$\sum_{\tilde{v}_t^m} \sum_{\tilde{h}_t^m} P(\tilde{v}_t^m, \tilde{h}_t^m \mid v_{-t}^m; \theta) \frac{\delta}{\delta \theta_l} E(\tilde{v}_t^m, \tilde{h}_t^m \mid v_{-t}^m; \theta)$$

The first term in the sum of Equation (15) is an expectation over hidden vectors distributed according to the probabilistic model's inference calculation: an example is the product of the unit-wise inference equations in Equation (13), which corresponds to energy function (8). In one embodiment, the sum over all possible hidden vectors is avoided by sampling vectors from the inference equation, or by using mean-field equations.

The second term in the sum of Equation (15) is more difficult to evaluate exactly, since it is the model's expectation over all hidden and visible vector combinations. One embodiment obtains an unbiased estimate of this expectation by performing alternating Gibbs sampling (alternating between Equation (13) and Equation (14)) until the machine learning component 300 has reached equilibrium, and then using samples from this equilibrium distribution. Other alternative methods include, for example, persistent contrastive divergence.

The derivatives referenced in Equation (15) are also computed. For example, the derivatives of Equation (8) with respect to each parameter are:

$$\frac{\delta}{\delta \theta_{w_{ijd}}} E(v_t, h_t \mid v_{-t}; \theta) = v_{t,i} h_{t,j} \sum_{i'} v_{-t,i'} x_{i'jd} \quad (16)$$

$$\frac{\delta}{\delta \theta_{x_{i'jd}}} E(v_t, h_t \mid v_{-t}; \theta) = h_{t,j} v_{-t,i'} \sum_{i} v_{t,i} w_{ijd} \quad (17)$$

$$\frac{\delta}{\delta \theta_{b_j^h}} E(v_t, h_t \mid v_{-t}; \theta) = h_j \quad (18)$$

$$\frac{\delta}{\delta \theta_{b_i^v}} E(v_t, h_t \mid v_{-t}; \theta) = v_i \quad (19)$$

Extensions for Multilayer Invariant Boltzmann Machine

As previously discussed, multilayered (or "multilevel") machine learning components (e.g., multi-layered neural networks, Boltzmann machines, etc.) have the capacity to learn more sophisticated features than single layered machine learning components. In addition, invariances are compounded as individually invariant features are combined.

One method for training the multilevel networks is to train the bottom layer network for a number of training samples, freeze the parameters of that layer and use it to infer outputs, stack another layer on top of the network and treat the outputs of the first layer as the inputs to the next layer, train the second layer for a number of training samples, freeze the weights, and repeat for as many layers as desired.

The layers need not be cleanly separated. For example, there may be weights that connect a unit at one layer to a unit at a non-adjacent layer in the network. This does not significantly change the algorithms presented, and it should be recognized how to deal with the extension.

Approximate inference in a multilayered network can be done by applying the single-layer inference equations, for example, Equation (13) with the inferred hidden activities becoming the inputs to the next layer. Similarly, generation can be done by repeatedly applying Equation (14), with the generated input activities becoming the hidden inputs to the layer below. It is also possible to combine the "bottom-up" and "top-down" influences for each layer. For example, if the first layer of hidden units (connecting to v) is $h^1$ and the second layer of hidden units is $h^2$, and the superscript on the parameters corresponds to each parameter's layer, then the combined inference on $h^1$ could be:

$$P(h_{t,j}^1 = 1 \mid v_t, h_t^2, v_{-t}, h_{-t}^1; \theta) = \quad (20)$$

$$\sigma\left(\frac{1}{2}\left[\sum_d \left(\sum_i v_{t,i} w_{ijd}^1\right)\left(\sum_{i'} v_{-t,i'} x_{i'jd}^1\right) + b_j^{1,h^1} + \sum_k h_{t,k}^2 \sum_d w_{jkd}^2 \sum_j h_{-t,j}^1 x_{jkd}^2 + b_j^{2,h^1}\right]\right)$$

This foregoing would be useful, for example, in using some amount of high-level knowledge to inform the interpretation of ambiguous low-level signals.

Lateral connections in Invariant Boltzmann Machines

In an alternative embodiment of machine learning component 300, connections from a unit of one layer can be made to a unit of the same layer so that the "top-down" influence can, for example, specify the general properties of the layer below, and the layer below can refine or "clean up" this specification.

An example which incorporates weights $\bar{\omega}$ between the visible units:

$$E(v_t, h_t \mid v_{-t}; \theta) = \sum_i \sum_j \sum_{i'} v_{t,i} h_{t,j} v_{-t,i'} \sum_d w_{ijd} x_{i'jd} + \sum_i \sum_{k<i} v_{t,i} v_{t,k} \bar{w}_{ik} + \sum_j b_j^h h_j + \sum_i b_i^v v_i \quad (21)$$

For generating, $\Delta E_{dn,i}$ is computed as in Equation (14), and then the visible units are individually Gibbs sampled for a number of iterations, according to:

$$P(v_{t,i} = 1 \mid h_t, v_{-t}, v_{t,\backslash i}; \theta) = \sigma\left(\Delta E_{dn,i}(h_t, v_{-t}; \theta) + \sum_{k \neq i} v_{t,k} \bar{w}_{ik}\right) \quad (22)$$

where $v_{t,\backslash i}$ is the vector of all the units in $v_t$ except unit $v_{t,i}$.

Inference can still be done, for example, with Equation (13). Other changes, for example, to the derivatives of the energy function (21), should be readily recognized.

Connections may also be added between the current hidden vector and previous hidden vectors. It should be recognized by those of ordinary skill in the art how to extend the equations given here to this case.

Invariance Calculations in Invariant Boltzmann Machines

With machine learning component utilizing Equation (8) as its energy function, the various invariance objectives given in Equations (1-4) can be maximized with gradient ascent: that is, computing the derivative 222 of the invariance objective with respect to each parameter for an example or set of examples, adding a small scaling of that derivative to the parameter, and repeating.

For example, if the temporal coherence objective in Equation (6) is used, but with logarithms for computational convenience (and defining $\psi_j$ for notational convenience), the objective is:

$$\Psi_j(\theta) = (\psi_j(\theta))^2 \quad (23)$$

$$\psi_j(\theta) = \log\left(\frac{\frac{1}{MT}\sum_{m=1}^M \sum_{t=1}^T (h_{j,t}^m - \mu_{h_j})^2}{\frac{1}{M(T-1)}\sum_{m=1}^M \sum_{t=2}^T (h_{j,t}^m - h_{j,t-1}^m)^2}\right) - \log(\Psi_j^*)$$

For example, for a machine learning component 300 with energy function in Equation (8), and using the definition of $\Delta E_{up,j}(v_t, v_{-t}; \theta)$ from Equation (13), the derivative 222 of objective (23) with respect to a parameter $\theta_l$ is:

$$\frac{\delta}{\delta \theta_l} \Psi_j(\theta) = \qquad (24)$$

$$\psi_j(\theta) \Bigg( \frac{1}{\sum_{m=1}^{M} \sum_{t=1}^{T} (h_{j,t}^m - \mu_{h_j})^2} \sum_{m=1}^{M} \sum_{t=1}^{T} (h_{j,t}^m - \mu_{h_j}) \cdot h_{j,t}^m (1 - h_{j,t}^m)$$

$$\frac{\delta}{\delta \theta_l} \Delta E_{up,j}(v_t^m, v_{-t}^m; \theta) - \frac{1}{\sum_{m=1}^{M} \sum_{t=2}^{T} (h_{j,t}^m - h_{j,t-1}^m)^2}$$

$$\sum_{m=1}^{M} \sum_{t=2}^{T} (h_{j,t}^m - h_{j,t-1}^m) \cdot \Big[ h_{j,t}^m (1 - h_{j,t}^m) \frac{\delta}{\delta \theta_l} \Delta E_{up,j}(v_t^m, v_{-t}^m; \theta) -$$

$$h_{j,t-1}^m (1 - h_{j,t-1}^m) \frac{\delta}{\delta \theta_l} \Delta E_{up,j}(v_{t-1}^m, v_{-(t-1)}^m; \theta) \Big] \Bigg)$$

where the derivatives of Equation (13) with respect to the parameters are as follows:

$$\Delta E_{up,j}(v_t^m, v_{-t}^m; \theta) = \sum_d \Big( \sum_i v_{t,i} w_{ijd} \Big) \Big( \sum_{i'} v_{-t,i'} x_{i'jd} \Big) + b_j^h \qquad (25)$$

$$\frac{\delta}{\delta w_{ijd}} \Delta E_{up,j}(v_t^m, v_{-t}^m; \theta) = v_{t,i} \sum_{i'} v_{-t,i'} x_{i'jd} \qquad (26)$$

$$\frac{\delta}{\delta x_{i'jd}} \Delta E_{up,j}(v_t^m, v_{-t}^m; \theta) = v_{-t,i'} \sum_i v_{t,i} w_{ijd} \qquad (27)$$

$$\frac{\delta}{\delta b_j^h} \Delta E_{up,j}(v_t^m, v_{-t}^m; \theta) = 1 \qquad (28)$$

$$\frac{\delta}{\delta b_j^v} \Delta E_{up,j}(v_t^m, v_{-t}^m; \theta) = 0 \qquad (29)$$

Static Inference in Invariant Boltzmann Machines

Although certain embodiments herein have described using temporal data for training, it is nonetheless possible to perform invariant recognition on static (non-temporal) data. For example, in one such embodiment, this is done by using a fully trained network to infer on a temporal stream, and learning a new static network by performing regression on the mapping from individual visible vectors to individual hidden vectors. To maintain the "subunit" nature of the Equation (8), an extension of quadratic features could be used with two distinct sets of weights $\{w_{ijd}^1\}$ and $\{w_{ijd}^2\}$:

$$E(v_t, h_t; \theta) = \qquad (30)$$

$$\sum_i \sum_j \sum_{i'} v_{t,i} h_{t,j} v_{t,i'} \sum_d w_{ijd}^1 w_{i'jd}^2 + \sum_i b_i^h h_j + \sum_i b_i^v v_i$$

Another embodiment uses the same model as FIG. 3 or 4, copies the current input into the previous time steps-which is equivalent to using the exact weights learned during temporal training in the static energy function (30).

Example of Alternative Embodiment of Machine Learning Component Architecture.

The machine learning component of FIG. 3 is merely exemplary of many learning architectures that may be used consistent with the teaching herein. For Example, alternative embodiments do not consider "previous" input vectors. One such embodiment is constructed form hidden layers in which some, or all, of the individual hidden units can be considered as having a multinomial state distribution over a multiplicity of stochastic hidden states rather than a binominal distribution over stochastic binary states. When such units are used in multilayered machine learning component it can be useful to partition the available states of the multinomial hidden unit into predefined sets, and then use either an indicator variable to denote whether any element of a given set of possible states is active or to use a summary measure of the state distribution within a set (for example, the probability that any one member of the set has been "selected".) Furthermore, it can also be useful to forward these indicator variables (or summary probabilities) in place of the unit activities in a manner analogous to that depicted in FIG. 3. It should be recognized by those of ordinary skill in the art that such a formulation can also be considered as equivalent to using hidden layers of binary stochastic hidden units in which the hidden units are grouped together in "pools" in which an additional constraint that at most one member of the pool may be active at a given time is applied; and to then forwarding to the next layer, in the case of a multilayer machine learning component, information about whether any members of the "pool" are active. Furthermore, it should be clear to those of ordinary skill in the art how to integrate such units into complete schemes for both inference and generation in a multilayer machine learning component.

Methods and Applications

Figure 5:
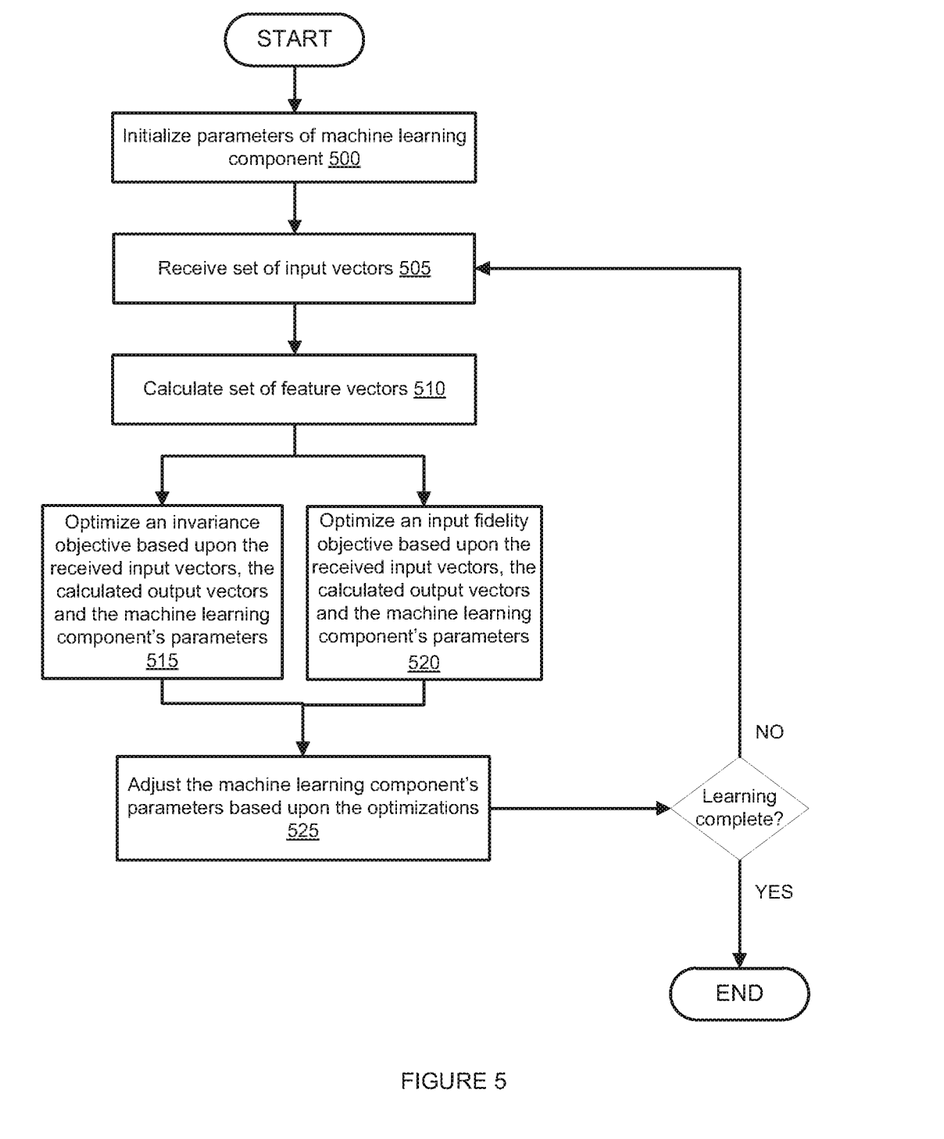
FIG. 5 depicts a flowchart of steps for training a machine learning component, according to an embodiment of the invention.

FIG. 5 depicts a flowchart of steps for a training machine learning component, according to an embodiment of the invention. In step 500, the parameters of machine learning component 130 are initialized, for example with small random variables. A loop then commences for one or a plurality of iterations until learning is complete includes 505, in which input vectors are received and 510 in which feature vectors are generated. Thus, parameters 138 of machine learning component may be adapted according to the input data and the learning objectives 200. Machine learning component 130 receives input vectors, computes feature vectors, and optimizes two objective functions: an invariance objective and an input fidelity objective. In one embodiment steps 515 and 520 may be performed in a parallel fashion. In step 525, machine learning component adjusts its parameters in accordance with the optimizations. If learning is mathematically or heuristically determined to be complete, the process stops, otherwise the procedure repeats from step 505.

After machine learning component 300 is trained in a layer-by-layer fashion, it can be applied in many different uses other than the pattern recognition system of FIG. 1, including generating novel static and temporal data streams, "filling in" missing data in the input, classifying the static or temporal input patterns, or making decisions or inducing actions based on the static or temporal input patterns.

When used in classification, one embodiment trains a multi-layered network in the unsupervised manner one layer at a time, then trains a classifier at the output of the overall network. While training the classifier, it is also possible to "fine-tune" the learned parameters of the unsupervised layers to perform better at classification, for example using back-propagation.

It should be recognized that various modifications and changes may be made to the specific embodiments described herein without departing from the broader spirit and scope of the invention as set forth in the appended claims. For example, feature vectors produced by a machine learning component as described herein may be used for purposes other than classification. In one alternative embodiment, feature vectors produced by machine learning components herein can be used for visualization purposes rather than classification, for example, by replacing a classifier with a non-linear dimensionality reduction module. Similarly, although the embodiments herein have focused on pattern recognition systems, it should be recognized that the machine learning components discussed herein may be used in other contexts and environments. Furthermore, while certain embodiments discussed herein used digital images as an input vector, it should be recognized that any input vectors may be used consistent with the teachings herein, including, for example, speech samples (e.g. for speech recognition), word vectors (e.g. for language processing) and the like. While the machine learning components discussed herein have utilized forms of Boltzmann machines, it should be recognized that other types of machine learning components, such as other neural networks, Bayesian networks and the like may be used consistent with the teachings herein. Similarly, it should be recognized that learning objectives other than invariance and input fidelity objectives may be utilized consistent with the teachings herein. For example, alternative embodiments may utilize a sparsity-inducing objective, where most activities are encouraged to be zero: there are many methods for doing this, including simply choosing a target activity s* and performing gradient descent on $(u_{h_j}-s^*)^2$, where $u_{h_j}$ is defined for example in Equation (5).

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method to facilitate pattern recognition comprising:
processing a set of vectors into feature vectors; wherein the processing comprises employing machine learning component adjusted parameters; wherein the machine learning component adjusted parameters are adjusted based at least in part on at least partially conflicting learning objectives including an input fidelity objective and an invariance objective, and are further adjusted at least in part by adding one or more scaled derivatives of the input fidelity objective approximately concurrently with one or more scaled derivatives of the invariance objective to one or more of the machine learning component adjusted parameters.

2. The method of claim 1 further comprising: classifying test patterns based at least in part on the set of feature vectors.

3. The method of claim 1 further comprising:
performing non-linear dimensionality reduction on the set of feature vectors for visualization or analysis.

4. The method of claim 1 wherein the input fidelity objective comprises a likelihood objective.

5. The method of claim 1 wherein the invariance objective further comprises invariance for transformations and/or intra-class variations.

6. The method of claim 1 wherein the at least partially conflicting learning objectives comprises a temporal coherence objective.

7. The method of claim 1 wherein the input vectors comprise images.

8. The method of claim 1 wherein the input vectors comprise audio input.

9. An apparatus comprising: a computing device; the computing device to facilitate pattern recognition for a set of vectors; the computing device to further process the set of vectors into feature vectors; wherein the computing device to include a machine learning component to adjust machine learning component parameters based at least in part on at least partially conflicting learning objectives to include an input fidelity objective and an invariance objective, the machine learning component further to add one or more scaled derivatives of the input fidelity objective approximately concurrently with one or more scaled derivatives of the invariance objective to one or more of the machine learning component parameters to adjust the machine learning component parameters.

10. The apparatus of claim 9 further comprising: a classifier of the machine learning component to compute a prediction.

11. The apparatus of claim 9 wherein the computing device also to perform non-linear dimensionality reduction.

12. The apparatus of claim 9 wherein individual layers to comprise a Boltzmann machine.

13. The apparatus of claim 12, wherein individual Boltzmann machine layers to comprise a factored third-order Boltzmann machine.

14. The apparatus of claim 12 wherein the apparatus to comprise more than one layer.

15. The apparatus of claim 14, the apparatus to process individual layers as a one layer Boltzmann machine.

16. The apparatus of claim 9 wherein the input fidelity objective to comprise a likelihood objective.

17. The apparatus of claim 9 wherein the invariance objective further to comprise invariance for transformations and/or intra-class variations.

18. The apparatus of claim 9 wherein the at least partially conflicting learning objectives to comprise a temporal coherence objective.

19. The apparatus of claim 9 wherein the input vectors to include images.

20. The apparatus of claim 9 wherein the input vectors to include audio input.

* * * * *